US010798395B2

(12) United States Patent
Zhou et al.

(10) Patent No.: US 10,798,395 B2
(45) Date of Patent: *Oct. 6, 2020

(54) VIDEO ENCODING WITH CONTENT ADAPTIVE RESOURCE ALLOCATION

(71) Applicant: Oath Inc., New York, NY (US)

(72) Inventors: Jian Zhou, Fremont, CA (US);
Congxia Dai, Campbell, CA (US); Heri Zhao, Santa Clara, CA (US);
Zhonghua Ma, San Jose, CA (US);
Xumin Wu, Cupertino, CA (US);
Michael Chang-Ping Chen, San Jose, CA (US); Sagar Dattatraya Bhandare, Bloomington, IN (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,000

(22) Filed: May 24, 2019

(65) Prior Publication Data

US 2019/0281315 A1    Sep. 12, 2019

Related U.S. Application Data

(63) Continuation of application No. 15/625,009, filed on Jun. 16, 2017, now Pat. No. 10,306,250.

(51) Int. Cl.
*H04N 19/436* (2014.01)
*H04N 19/167* (2014.01)
*H04N 19/14* (2014.01)
*H04N 19/147* (2014.01)
*H04N 19/115* (2014.01)
*H04N 19/127* (2014.01)
*H04N 19/172* (2014.01)
(Continued)

(52) U.S. Cl.
CPC ......... *H04N 19/436* (2014.11); *H04N 19/115* (2014.11); *H04N 19/127* (2014.11); *H04N 19/132* (2014.11); *H04N 19/14* (2014.11); *H04N 19/147* (2014.11); *H04N 19/15* (2014.11); *H04N 19/167* (2014.11); *H04N 19/172* (2014.11); *H04N 19/192* (2014.11)

(58) Field of Classification Search
CPC ...... H04N 19/109; H04N 19/11; H04N 19/13; H04N 19/134; H04N 19/136; H04N 19/14
USPC .......................... 375/240.02, 240.08, 240.1
See application file for complete search history.

(56) References Cited

U.S. PATENT DOCUMENTS

2016/0173875 A1* 6/2016 Zhang ................. H04N 19/124
375/240.03
2018/0124146 A1* 5/2018 Chen .................... H04L 65/4069

* cited by examiner

*Primary Examiner* — Dominic D Saltarelli
(74) *Attorney, Agent, or Firm* — Cooper Legal Group, LLC

(57) ABSTRACT

One or more computing devices, systems, and/or methods for video encoding are provided. For example, a video file may be segmented into at least a first portion and a second portion. The first portion may be analyzed to determine that the first portion is associated with a first level of complexity, and the second portion may be analyzed to determine that the second portion is associated with a second level of complexity. A first bitrate associated with the first level of complexity may be determined, and a second bitrate associated with the second level of complexity may be determined. The first portion may be encoded at the first bitrate to generate a first encoded portion, and the second portion may be encoded at the second bitrate to generate a second encoded portion. The first encoded portion and the second encoded portion may be assembled to generate an optimized video file.

20 Claims, 12 Drawing Sheets

(51) Int. Cl.
*H04N 19/132* (2014.01)
*H04N 19/15* (2014.01)
*H04N 19/192* (2014.01)

< Go Back   Analyzing Your Video

Here are the optimal bitrates we've determined for your video:

FIRST RESOLUTION
AVERAGE BITRATE 400 KB/S
FIRST PORTION: 350 KB/S
SECOND PORTION: 450 KB/S

SECOND RESOLUTION
AVERAGE BITRATE 500 KB/S
FIRST PORTION: 450 KB/S
SECOND PORTION: 500 KB/S

THIRD RESOLUTION
AVERAGE BITRATE 600 KB/S
FIRST PORTION: 550 KB/S
SECOND PORTION: 650 KB/S

FOURTH RESOLUTION
AVERAGE BITRATE 700 KB/S
FIRST PORTION: 650 KB/S
SECOND PORTION: 750 KB/S

FIFTH RESOLUTION
AVERAGE BITRATE 900 KB/S
FIRST PORTION: 850 KB/S
SECOND PORTION: 950 KB/S

VIDEO ENCODING WITH CONTENT ADAPTIVE RESOURCE ALLOCATION

CROSS REFERENCE TO RELATED APPLICATION

This application claims priority to and is a continuation of U.S. application Ser. No. 15/625,009, filed on Jun. 16, 2017, entitled "VIDEO ENCODING WITH CONTENT ADAPTIVE RESOURCE ALLOCATION", which is incorporated herein.

BACKGROUND

Many devices, such as mobile phones, tablets, laptops, mp4 players and/or desktop computers, provide video output by playing a video file obtained by streaming from a network. The video output may vary in appearance, quality, etc. depending upon the type of video compression used to create the video file, and the resolution of the video file. Different video outputs may be deemed appropriate for different devices and/or contexts. For example, a first representation of video content with more compression and/or a lower resolution may be preferable for a mobile device with a slow network connection, while a second representation of the video content with less compression and/or a higher resolution may be preferable for a large screen device with a high speed network connection.

SUMMARY

Methods that encode video with a constant bitrate (CBR) may produce a video file that has visibly low quality in portions (e.g., sections) of the video that contain fine details and/or rapid motions, and may waste bandwidth by encoding portions of the video with fewer details at the same bitrate as those portions with the fine details and/or rapid motions. Such methods may be conducted in a sequential workflow to encode the video, which may make the encoding process excessively time consuming (and thus resource consuming) for videos with a long duration. Thus, a means to optimize encoding of videos in a manner that balances quality of video playback, usage of bandwidth and/or usage of time may be desirable, particularly for online video content publishers.

In accordance with the present disclosure, one or more computing devices and/or methods for video encoding are provided. In an example, a video file may be received (e.g., from a user of a video sharing platform). The video file may be segmented into at least a first portion and a second portion (e.g., where the portions may have similar or equal length, etc.). In parallel, the first portion may be analyzed (e.g., to determine a first Structural SIMilarity (SSIM), a first Constant Rate Factor (CRF), a first peak signal-to-noise ratio (PSNR), etc.) to determine that the first portion is associated with a first level of complexity, and the second portion may be analyzed (e.g., to determine a second SSIM, a second CRF, a second PSNR, etc.) to determine that the second portion is associated with a second level of complexity (e.g., different than the first level of complexity). In parallel, a first bitrate that is associated with the first level of complexity may be determined, and a second bitrate (e.g., different than the first bitrate) that is associated with the second level of complexity may be determined. In parallel, the first portion may be encoded at the first bitrate to generate a first encoded portion, and the second portion may be encoded at the second bitrate to generate a second encoded portion. The first encoded portion and the second encoded portion may be assembled to generate an optimized video file (e.g., comprising the first encoded portion concatenated to the second encoded portion).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5C is a component block diagram illustrating an example system for video encoding.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
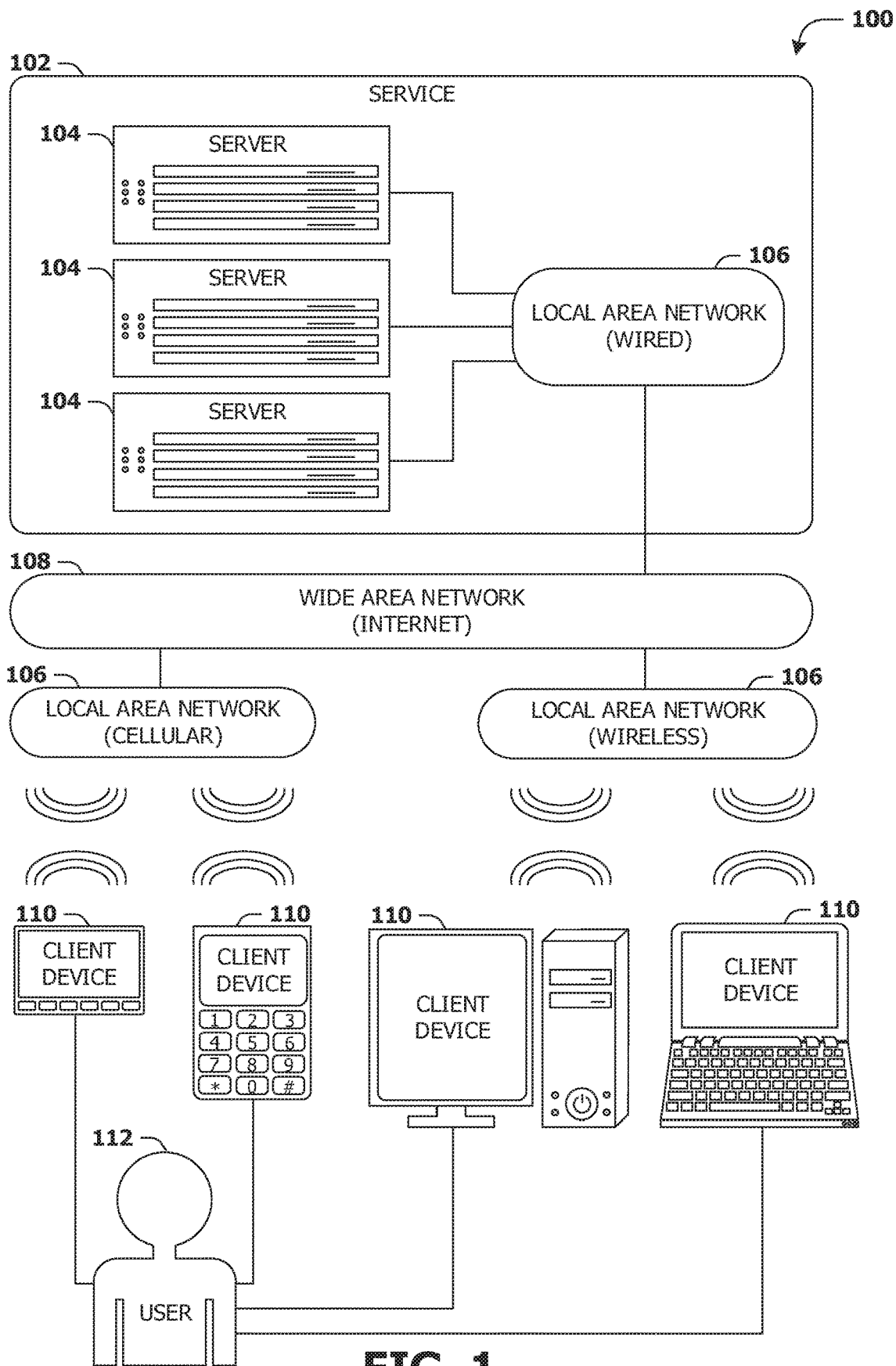
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
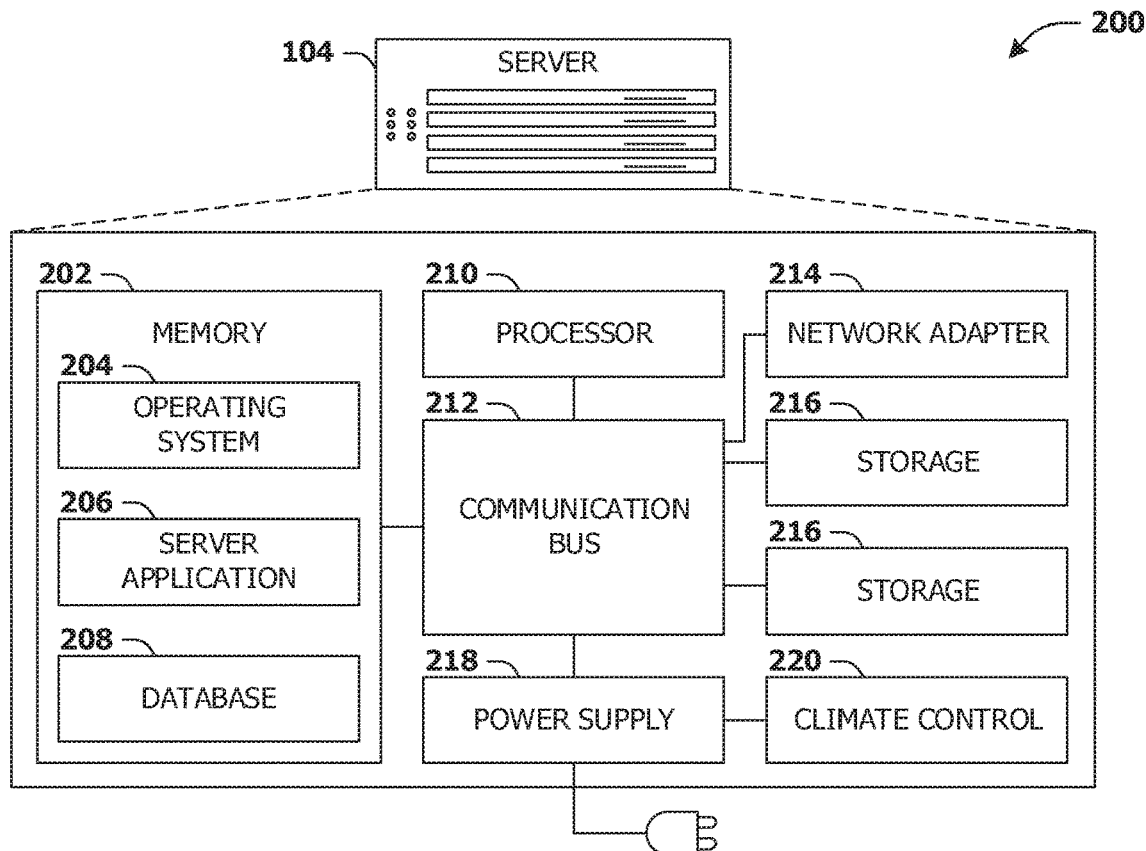
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow.

Many such servers 104 may be configured and/or adapted to utilize at least a portion of the techniques presented herein.

1.3. Client Device Configuration

Figure 3:
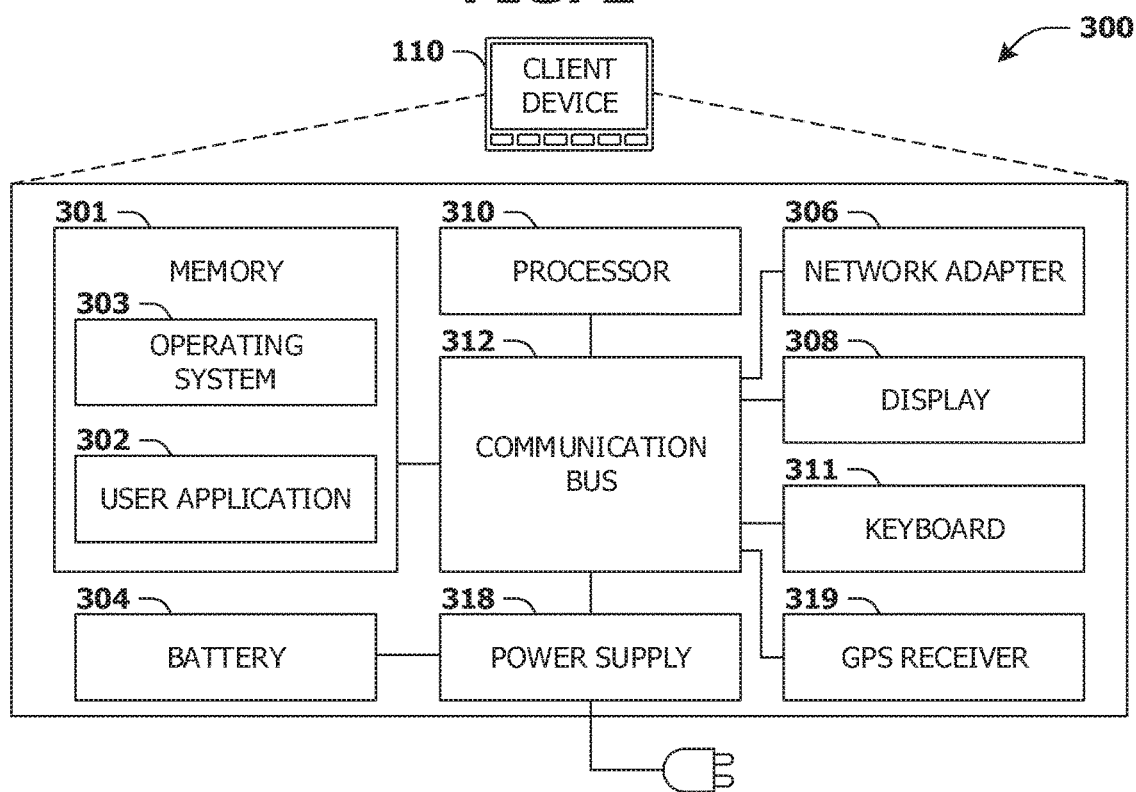
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for video encoding are provided. For example, a server, such as that of an online video content publisher, may serve to host a video received from a user of the server such that the hosted video may be accessed by a plurality of users. An original video file of the video that is received from the user may not be suitable for at least some of the plurality of users. For example, the original video file may be too large for a first user with a slow network connection to the server, or may be in a format that is not accessible to a second user. Thus, the original video file may be encoded into one or more video files that may be more suitable for the plurality of users. For example, the original video file may be encoded into a first video file that is smaller than the original video file (e.g., in terms of bit-rate and/or resolution), and thus may be suitable for the first user, and/or may be encoded into a second video file that is in a second format that is accessible to the second user. Encoding the original video file with a constant bitrate (CBR) may produce a video file that has visibly low quality in portions (e.g., sections) of the video that contain fine details and/or rapid motions, and may waste bandwidth by encoding portions of the video with fewer details at the same bitrate as those portions with the fine details and/or rapid motions. Encoding the original video file sequentially may also consume a significant amount of time and resources of the server and the user, which may be proportional to the length of the original video file, and thus may make it expensive to upload videos exceeding a threshold length. Thus, in accordance with one or more of the techniques presented herein, video may be encoded in a manner that is efficient, convenient, effective and/or timely.

Figure 4A:
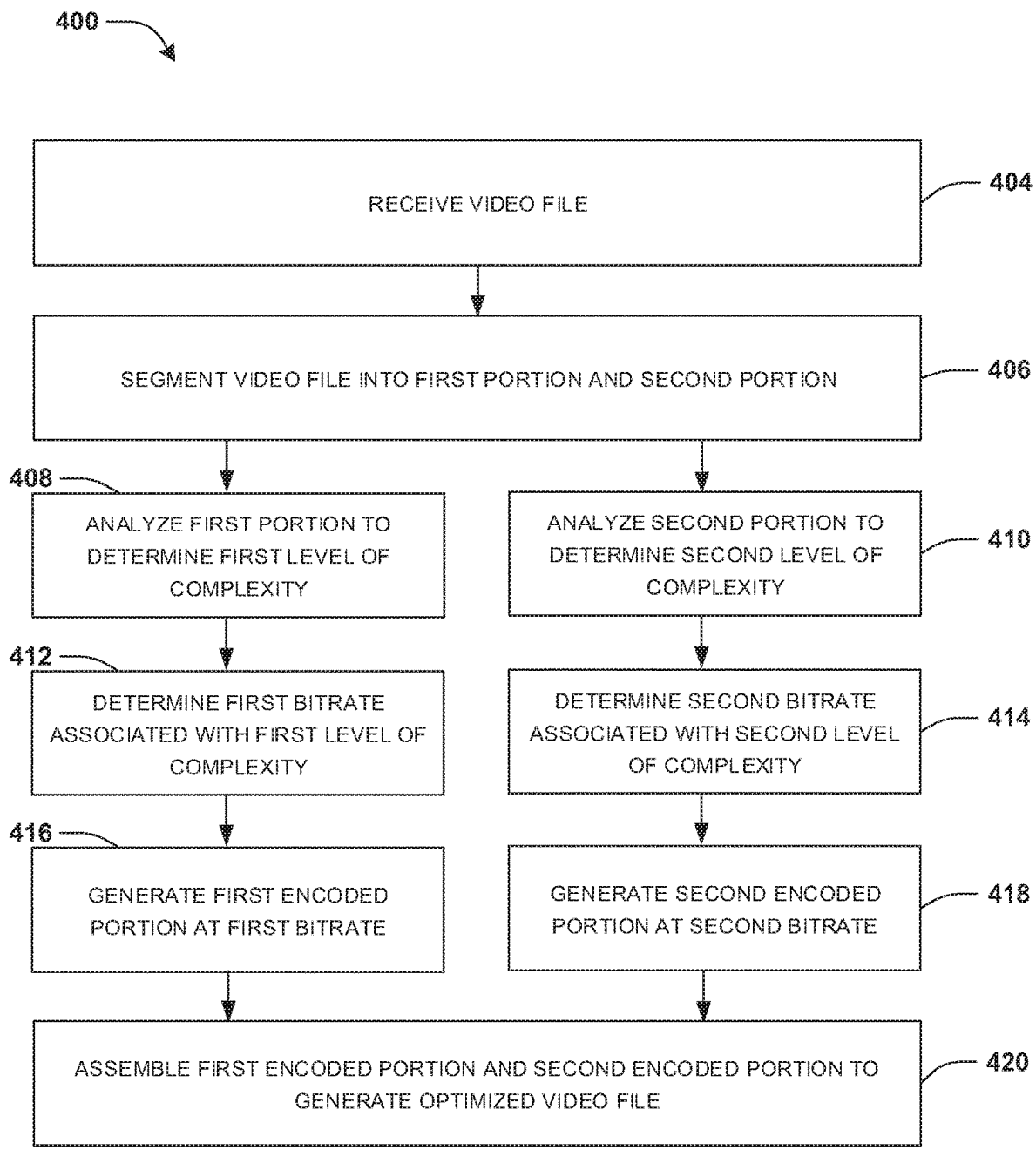
FIG. 4A is a flow chart illustrating an example method for video encoding.

An embodiment of (e.g., multi-pass variable bitrate (VBR)) video encoding is illustrated by an example method 400 of FIG. 4A. A user, such as user Jill, (e.g., and/or a device associated with the user) may access and/or interact with a website, an application, etc. that provides a platform for uploading video files to a server (e.g., of the website, the application, etc.). The server may host uploaded video files, and the website may provide access to view the uploaded video files to an audience. Accordingly, at 404, a video file may be received (e.g., by the server and/or from the user).

At 406, the video file may be segmented into at least a first portion (e.g., a first section of the video file) and a second portion (e.g., a second section of the video file). The first portion and the second portion may be of similar or equal length. It may be appreciated that the video file may be segmented into any number of portions, such as three, four, five, or five hundred, and that each of the portions may be of similar or equal length. The number of portions for the video file to be segmented into may be determined based upon a (e.g., default or user defined) desired length of each portion, or based upon a number of portions that the server and/or resources of the server may be capable of processing concurrently (e.g., and thus the number of portions that the video file is segmented into by the server may vary from a first time to a second time in accordance with a change in the capabilities, burden, etc. of the server from the first time to the second time). In some embodiments, the video file may be processed as a whole entity (e.g., without segmentation into portions).

At 408, the first portion of the video file may be analyzed to determine that the first portion is associated with a first level of complexity, and in parallel with 408, at 410, the second portion of the video file may be analyzed to determine that the second portion is associated with a second level of complexity. The first level of complexity may be different than the second level of complexity. For example, the first portion may comprise footage of a football game, which may include rapid movements and changes on the screen, and may thus be determined to be associated with a high level of complexity, while the second portion may comprise footage of football experts discussing the football game in a studio, which may include slow movements and little change on the screen, and may thus be determined to be associated with a low level of complexity.

In an example, analyzing the first portion of the video file may comprise determining a first Structural SIMilarity (SSIM) associated with the first portion and/or analyzing the second portion of the video file may comprise determining a second SSIM associated with the second portion. In another example, analyzing the first portion of the video file may comprise determining a first Constant Rate Factor (CRF) associated with the first portion and/or analyzing the second portion of the video file may comprise determining a second CRF associated with the second portion. In another example, analyzing the first portion of the video file may comprise determining a first peak signal-to-noise ratio (PSNR) associated with the first portion and/or analyzing the second portion of the video file may comprise determining a second PSNR associated with the second portion.

At 412, a first bitrate associated with the first level of complexity is determined, and in parallel with 412, at 414, a second bitrate associated with the second level of complexity is determined. The first bitrate may be different than the second bitrate. For example, if the first level of complexity is higher than the second level of complexity, the first bitrate may be determined to be higher than the second bitrate. In this manner, each portion of the video file may be assigned a bitrate appropriate for its corresponding level of complexity.

In an example, determining the first bitrate comprises selecting the first bitrate from a plurality of first bitrates in response to determining that the first bitrate is associated with at least a threshold increase in quality over another bitrate of the plurality of first bitrates. For example, the first bitrate may be selected over a lower bitrate of the plurality of first bitrates if the first bitrate is determined to provide a significant increase in quality over the lower bitrate; if the first bitrate were instead determined to provide very little increase in quality over the lower bitrate, the first bitrate may be determined to require the use of more resources without providing an adequate amount of improvement in quality in return (e.g., and may thus be determined to have too much cost in exchange for too little value) (e.g., and the first bitrate may thus not be selected over the lower bitrate). In this example, determining the second bitrate comprises selecting the second bitrate from a plurality of second bitrates in response to determining that the second bitrate is associated with at least a threshold increase in quality over another bitrate of the plurality of second bitrates.

In an example, the first bitrate and the second bitrate may be determined in association with encoding the video file in a first resolution. It may be appreciated that the video file may also be encoded in one or more other resolutions. For example, (e.g., in parallel with 412 and 414) a third bitrate associated with the first level of complexity may be determined, and in parallel, a fourth bitrate associated with the second level of complexity may be determined. The third bitrate and the fourth bitrate may be determined in association with encoding the (same) video file in a second resolution different than the first resolution. The third bitrate may be different than the first bitrate, and the fourth bitrate may be different than the second bitrate.

At 416, the first portion of the video file is encoded at the first bitrate to generate a first encoded portion, and in parallel with 416, at 418, the second portion of the video file is encoded at the second bitrate to generate a second encoded portion.

In an example, before the first portion of the video file and the second portion of the video file are encoded, a determination is made as to whether the first CRF that is associated with the first portion of the video file is within a threshold of the second CRF that is associated with the second portion of the video file. In response to determining that the first CRF is within the threshold of the second CRF, the encoding of the first portion of the video file and the encoding of the second portion of the video file may be performed. If, however, the first CRF was determined to not be within the threshold of the second CRF, the encoding may not be performed until one or more new bitrates and/or one or more new CRFs are determined for the first portion and/or the second portion. For example, the determination may be used to ensure that adjacent portions of a video do not have (e.g., visible) differences in quality exceeding a threshold.

At 420, the first encoded portion and the second encoded portion may be assembled (e.g., along with one or more other encoded portions corresponding to portions of the video file that the video file was segmented into) to generate an optimized video file. For example, the first encoded portion may be merged, concatenated and/or otherwise combined with the second encoded portion, and the optimized video file comprising the combination of the first encoded portion and the second encoded portion may be generated.

In an example, the optimized video file is in the first resolution, and a second optimized file in the second resolution may also be generated using the video file. For example, (e.g., in parallel with 416 and 418) the first portion of the video file may be encoded at the third bitrate (e.g., associated with the second resolution) to generate a third encoded portion, and in parallel, the second portion of the video file may be encoded at the fourth bitrate (e.g., associated with the second resolution) to generate a fourth encoded portion. In the example, (e.g., in parallel with 420) the third encoded portion and the fourth encoded portion may be assembled to generate the second optimized video file.

It may be appreciated that the video file, the optimized video file and/or the second optimized video file may be a same format and/or different formats. Some exemplary video formats that may be used for the video file, the optimized video file and/or the second optimized video file include WebM, Matroska, Flash Video, F4V, Vob, Ogg, Dirac, GIF, Multiple-image Network Graphics, AVI, Quick-Time, Windows Media Video, Raw video format, RealMedia, RealMedia Variable Bitrate, Advanced Systems Format, AMV, Moving Picture Experts Group (MPEG)-4, MPEG-1, MPEG-2, M4V, SVI, 3GPP, 3GPP2, Material Exchange Format, ROQ and/or Nullsoft Streaming Video.

Figure 4B:
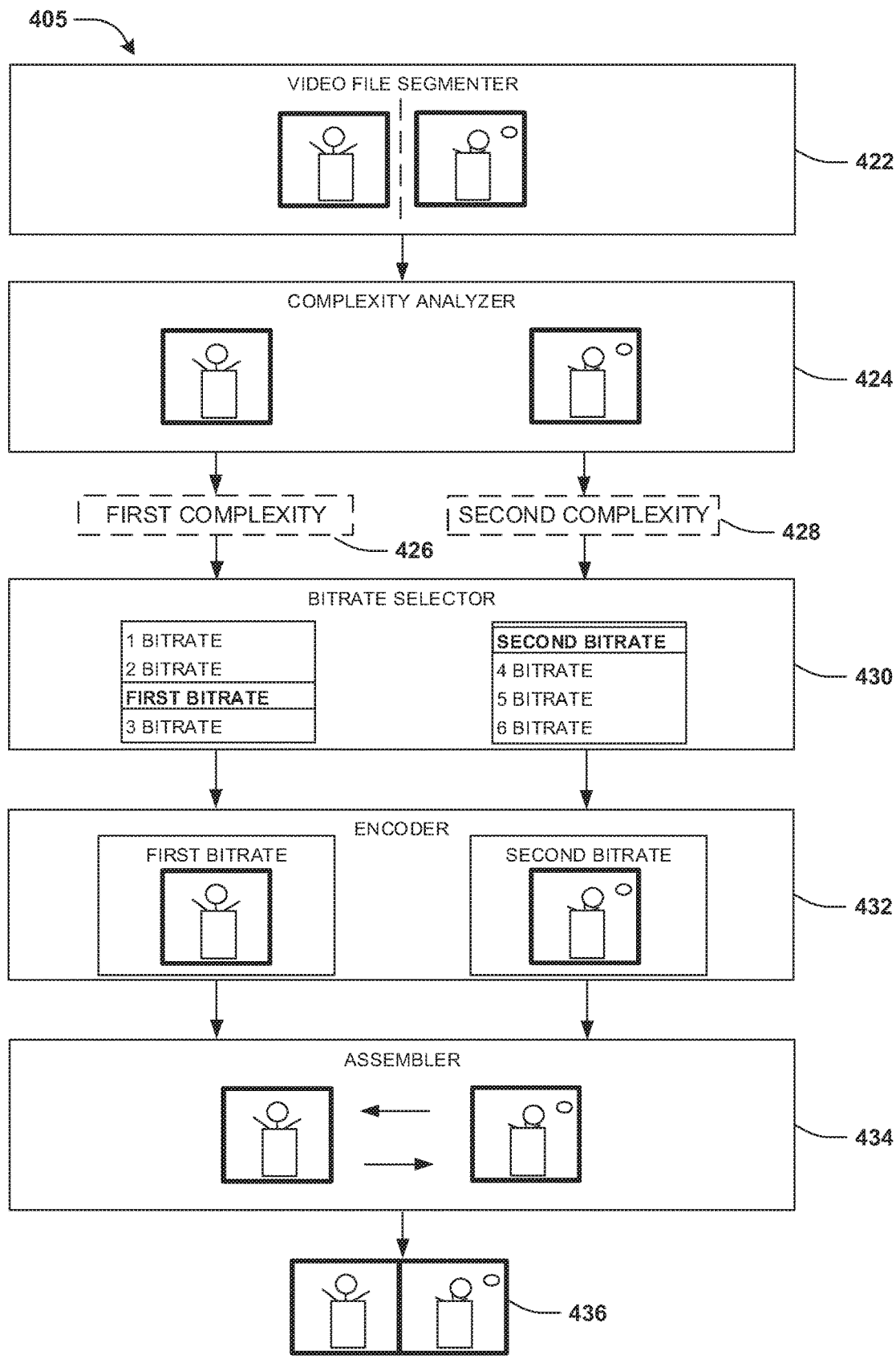
FIG. 4B is a component block diagram illustrating an example system for video encoding.

FIG. 4B illustrates an example of a system 405 for video encoding. Video file segmenter 422 may segment a video file into one or more portions, such as a first portion and a second portion. Complexity analyzer 424 may (e.g., in parallel) analyze the first portion and the second portion to determine a first complexity 426 associated with the first portion and a second complexity 428 associated with the second portion.

Bitrate selector 430 may (e.g., in parallel) select a first bitrate from a plurality of first bitrates based upon the first complexity 426 and a second bitrate from a plurality of second bitrates based upon the second complexity 428. The bitrate selector 430 may compare the first bitrate and the second bitrate, to determine that the first bitrate is within a threshold of the second bitrate before providing the first bitrate and/or the second bitrate to encoder 432 for encoding.

In an example, the bitrate selector 430 (e.g., and/or the complexity analyzer 424) may determine a first CRF associated with the first portion and a second CRF associated with the second portion. The first CRF may be selected from a plurality of first CRFs and/or calculated based upon the first portion and/or the first bitrate, and the second CRF may be selected from a plurality of second CRFs and/or calculated based upon the second portion and/or the second bitrate. The bitrate selector 430 may compare the first CRF and the second CRF, to determine that the first CRF is within a threshold of the second CRF before providing the first bitrate, the second bitrate, the first CRF and/or the second CRF to the encoder 432 for encoding.

In an example, the bitrate selector 430 (e.g., and/or the complexity analyzer 424) may determine a first SSIM associated with the first portion and a second SSIM associated with the second portion. The first SSIM may be selected from a plurality of first SSIMs and/or calculated based upon the first portion and/or the first bitrate, and the second SSIM may be selected from a plurality of second SSIMs and/or calculated based upon the second portion and/or the second bitrate. The bitrate selector 430 may compare the first SSIM and the second SSIM, to determine that the first SSIM is within a threshold of the second SSIM before providing the first bitrate, the second bitrate, the first SSIM and/or the second SSIM to the encoder 432 for encoding.

In an example, the bitrate selector 430 (e.g., and/or the complexity analyzer 424) may determine a first PSNR associated with the first portion and a second PSNR associated with the second portion. The first PSNR may be selected from a plurality of first PSNRs and/or calculated based upon the first portion and/or the first bitrate, and the second PSNR may be selected from a plurality of second PSNRs and/or calculated based upon the second portion and/or the second bitrate. The bitrate selector 430 may compare the first PSNR and the second PSNR, to determine that the first PSNR is within a threshold of the second PSNR before providing the first bitrate, the second bitrate, the first PSNR and/or the second PSNR to the encoder 432 for encoding.

Encoder 432 may encode the first portion based upon the first bitrate, the first CRF, the first SSIM and/or the first PSNR to generate a first encoded portion, and may (e.g., in parallel) encode the second portion based upon the second bitrate, the second CRF, the second SSIM and/or the second PSNR to generate a second encoded portion.

Assembler 434 may assemble the first encoded portion and the second encoded portion to generate an optimized video file 436 comprising a combination of the first encoded portion and the second encoded portion.

Figure 4C:
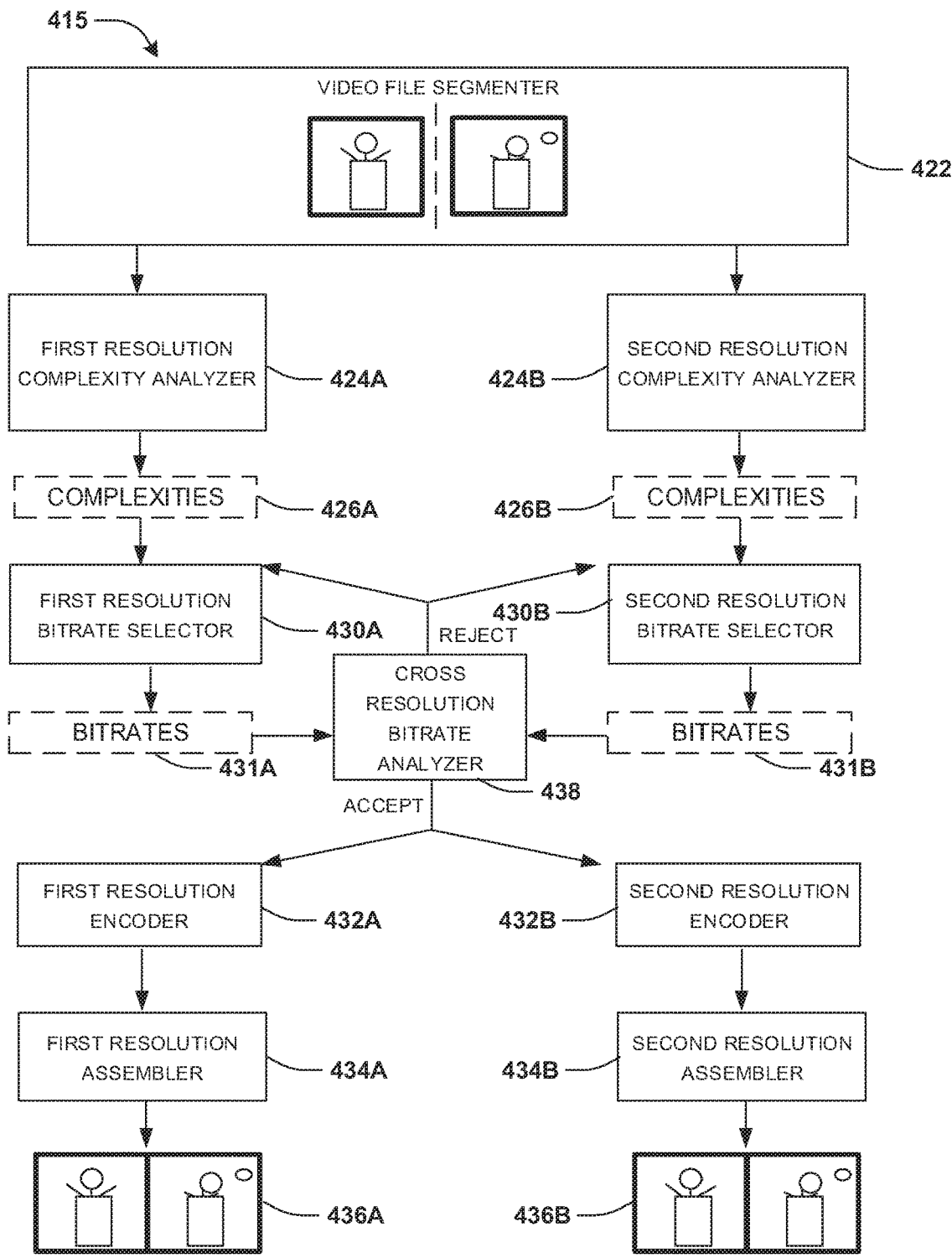
FIG. 4C is a component block diagram illustrating an example system for video encoding.

FIG. 4C illustrates an example of a system 415 for video encoding with more than one resolution. Video file segmenter 422 may segment a video file into one or more portions, such as a first portion and a second portion. First resolution complexity analyzer 424A may analyze the first portion and the second portion in association with a first resolution to determine complexities 426A, and in parallel, second resolution complexity analyzer 424B may analyze the first portion and the second portion in association with a second resolution to determine complexities 426B. The first resolution may be different than the second resolution.

First resolution bitrate selector 430A may select bitrates 431A based upon the complexities 426A, and in parallel, second resolution bitrate selector 430B may select bitrates 431B based upon the complexities 426B.

Cross resolution bitrate analyzer 438 may analyze (e.g., compare) the bitrates 431A with the bitrates 431B. For example, the cross resolution bitrate analyzer 438 may determine whether a difference between the bitrates 431A and the bitrates 431B is justified by a difference in quality exceeding a threshold in accordance with one or more rules. The determination of the difference in quality may be based upon a comparison of CRFs (e.g., determined for the first portion and/or the second portion and) associated with the first resolution with CRFs (e.g., determined for the first portion and/or the second portion and) associated with the second resolution, a comparison of SSIMs (e.g., determined for the first portion and/or the second portion and) associated with the first resolution with SSIMs (e.g., determined for the first portion and/or the second portion and) associated with the second resolution and/or a comparison of PSNRs (e.g., determined for the first portion and/or the second portion and) associated with the first resolution with PSNRs (e.g., determined for the first portion and/or the second portion and) associated with the second resolution.

If the cross resolution bitrate analyzer 438 rejects the bitrates 431A and/or the bitrates 431B, the first resolution bitrate selector 430A may select new bitrates based upon the complexities 426A and/or feedback from the cross resolution bitrate analyzer 438. Alternatively and/or additionally, if the cross resolution bitrate analyzer 438 rejects the bitrates 431A and/or the bitrates 431B, the second resolution bitrate selector 430B may select new bitrates based upon the complexities 426B and/or feedback from the cross resolution bitrate analyzer 438.

If the cross resolution bitrate analyzer 438 accepts the bitrates 431A and the bitrates 431B, first resolution encoder 432A may encode the first portion and the second portion based upon the bitrates 431A, the CRFs associated with the first resolution, the SSIMs associated with the first resolution and/or the PSNRs associated with the first resolution to generate a first encoded portion in the first resolution and a second encoded portion in the first resolution. In parallel, if the cross resolution bitrate analyzer 438 accepts the bitrates 431A and the bitrates 431B, second resolution encoder 432B may encode the first portion and the second portion based upon the bitrates 431B, the CRFs associated with the second resolution, the SSIMs associated with the second resolution and/or the PSNRs associated with the second resolution to generate a first encoded portion in the second resolution and a second encoded portion in the second resolution.

First resolution assembler 434A may assemble the first encoded portion in the first resolution and the second encoded portion in the first resolution to generate a first resolution optimized video file 436A comprising a combination of the first encoded portion in the first resolution and the second encoded portion in the first resolution, and in parallel, second resolution assembler 434B may assemble the first encoded portion in the second resolution and the second encoded portion in the second resolution to generate a second resolution optimized video file 436B comprising a combination of the first encoded portion in the second resolution and the second encoded portion in the second resolution.

Figure 4D:
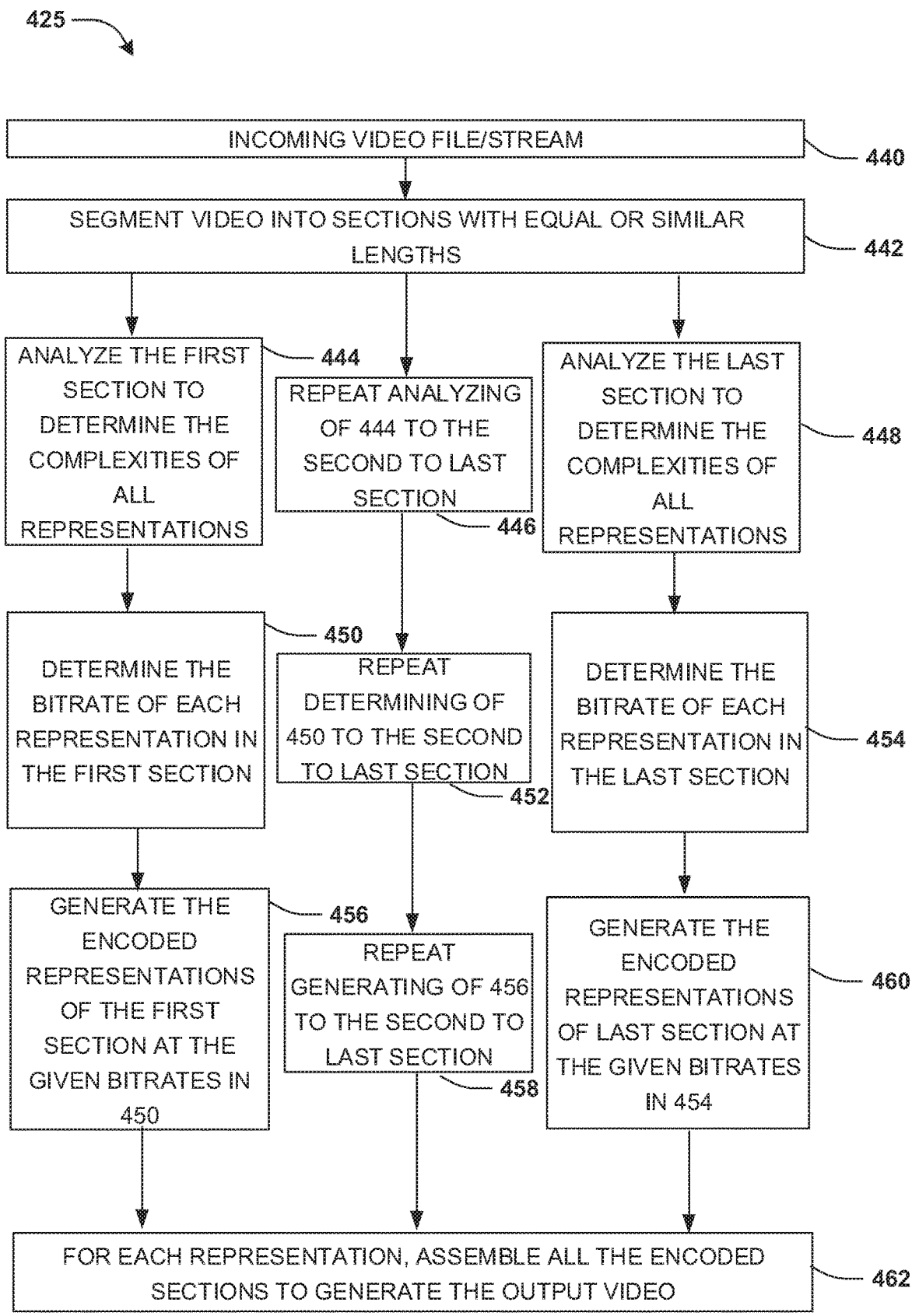
FIG. 4D is a flow chart illustrating an example method for video encoding.

Another embodiment of (e.g., multi-pass VBR) video encoding is illustrated by an example method 425 of FIG. 4D. A user, and/or a device associated with the user, may access and/or interact with a website, an application, etc. that provides a platform for uploading video files to a server (e.g., of the website, the application, etc.). The server may host uploaded video files, and the website may provide access to view the uploaded video files to an audience. Accordingly, at 440, a video file may be received (e.g., by the server and/or from the user).

At 442, the video file may be treated as a whole entity or it may be segmented into multiple sections with similar or equal length. The number of sections for the video file to be segmented into may be determined based upon a (e.g., default or user defined) desired length of each section, or based upon the number of sections that the server and/or resources of the server may be capable of processing concurrently (e.g., and thus the number of sections that the video file is segmented into by the server may vary from a first time to a second time in accordance with a change in the capabilities, burden, etc. of the server from the first time to the second time).

At 442, each video section may be represented in more than one representation in terms of associated resolutions. All representations may be processed in parallel or in a sequential manner, depending upon the available resource(s) that the server provides.

At 444, the first section of the video file may be analyzed to determine the complexity of each representation. In parallel with 444, at 446 to 448, the rest of the video sections may be analyzed to determine the complexity of each representation in each section. The complexity may be different from one section to another even if their representations in term of resolution are the same. For example, the first section may comprise footage of a football game, which may include rapid movements and changes on the screen, and may thus be determined to be associated with a high level of complexity, while the second section may comprise footage of football experts discussing the football game in a studio, which may include slow movements and little change on the screen, and may thus be determined to be associated with a low level of complexity.

In an example, analyzing the each section of the video file may comprise deciding its complexity from the measurement of its SSIM or PSNR, etc. The complexity may be derived with a trial encoding process with a pre-defined CRF value, and it may be associated with the output bitrate. Thus by given multiple CRF values, a trend of the complexity change may be obtained as output bitrate increases or decreases. Since there are multiple representations in terms of resolution in each section, multiple complexities may be derived, each for one representation.

At 444, after the complexity evaluation, each representation in each section may have a set of (bitrate, complexity) pairs, each associating with a CRF value. Based upon the set pair values, extrapolation or interpolation methods may be applied to get other (bitrate, complexity) pairs whose designated CRF value is not listed in the pre-defined set. However, the extrapolated or interpolated bitrate may not exceed a limit associated with a resolution.

At 450, a bitrate set for each representation in the first section is derived based upon the complexity obtained for each representation. In parallel with 450, at 454 and 452, a bitrate set for each representation in the second section to the last section is derived based upon the complexity obtained in each representation in each section. In this manner, each section of the video file may be assigned at least one bitrate appropriate for its corresponding level of complexity.

In an example, at 450, for each representation in the first section, a group of (bitrate, complexity) pairs from 444 may be sorted in an ascending order according to the bitrate. One (bitrate, complexity) pair in the assorted group may be dropped if compared with its immediate previous neighbor, a threshold increase in complexity and/or bitrate is not achieved.

In an example, at 450, after pruning the (bitrate, complexity) pair in each representation, inter-representation pruning may be conducted. This may start from the representation with the lowest resolution to the one with the highest resolution, or vice versa. Such process may also be conducted according a pre-defined order to traverse all the representations. One (bitrate, complexity) pair may be dropped, if certain threshold increase is not achieved compared with the maximum bitrate and/or complexity in a previously processed representation with smaller resolution. One (bitrate, complexity) pair may also be dropped, if certain threshold decrease is not achieved compared with the minimum bitrate and/or complexity from a previously processed representation with larger resolution.

In an example in 450, after both intra-representation pruning and inter-representation pruning, one or more final bitrates can be selected for each representation from the (bitrate, complexity) pairs, depending on the predefined number of output requirement. It may choose the lowest bitrate in the set, or the highest bitrate in the set, or the bitrate whose index is the n-th element in the set in ascending/descending order.

In an example in 450, for the same representation in each section, a joint decision may be applied so that the difference of the CRF values between two adjacent sections associated with the derived bitrates may not exceed certain threshold. Such a method may improve the chances that the quality from section to section is smooth enough (e.g., meets a threshold level of consistency/stability).

At 456, each representation in the first section of the video file is encoded at the selected bitrates to generate the first encoded section, and in parallel with 456, at 460 and 458, the representations in each of the rest sections of the video file is encoded at their selected bitrates to generate the encoded sections.

At 462, each representation in terms of resolution across some and/or all of the encoded sections may be assembled to generate the output video file in multiple representations.

Figure 5A:
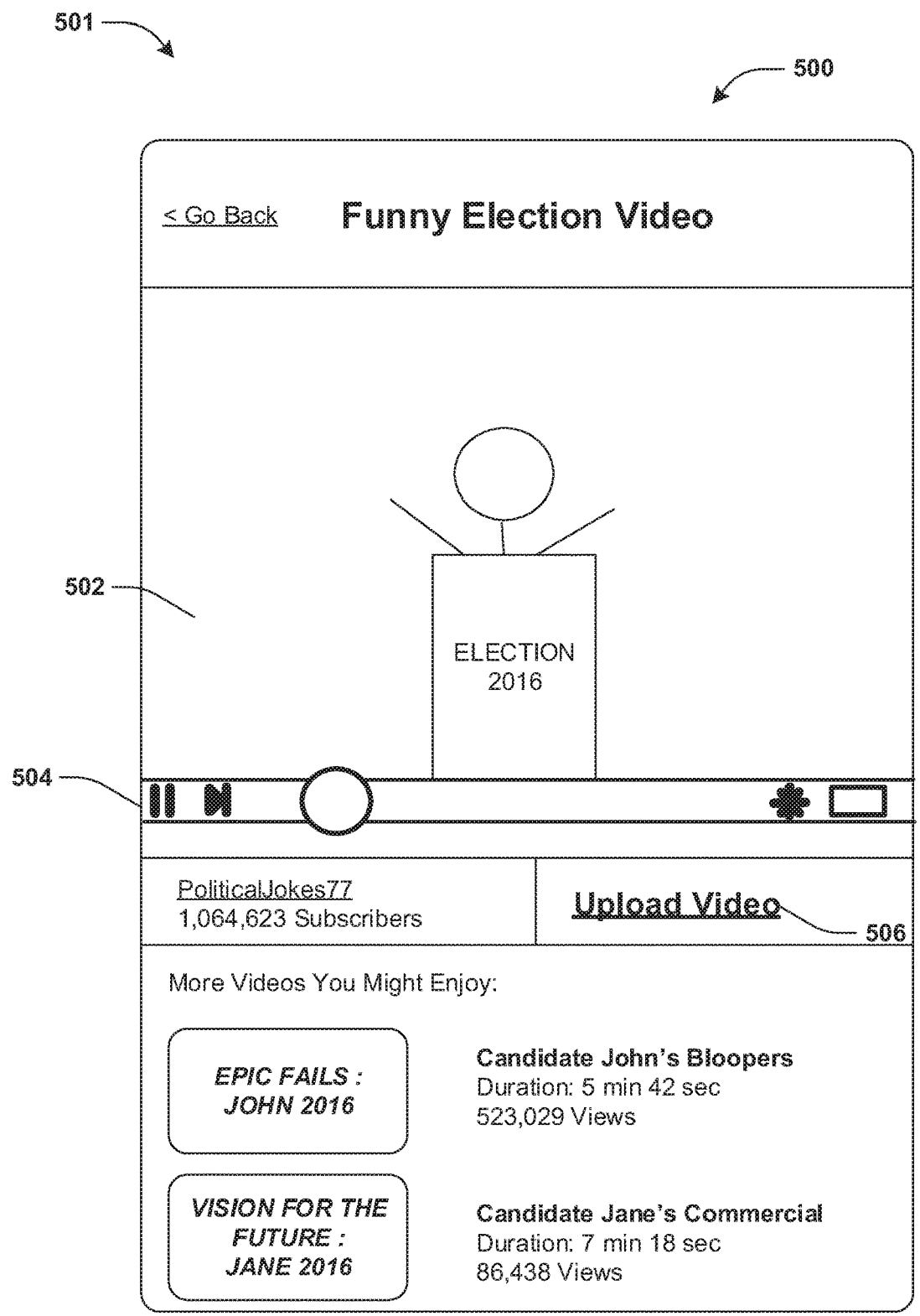
FIG. 5A is a component block diagram illustrating an example system for video encoding.

FIGS. 5A-5E illustrate examples of a system 501 for video encoding. FIG. 5A illustrates an interface 500 that may be displayed on a device of a user. The interface 500 may, in some examples, display an application, such as a video player, on the interface, which may include a video display portion 502 within which a video may be played, a video control bar 504, information about a source of the video, a control that when selected enables sharing the video, and/or one or more other recommended videos. The interface 500 may further display a video upload button 506, which may be selected by the user to upload one or more videos to a server associated with the application.

Figure 5B:
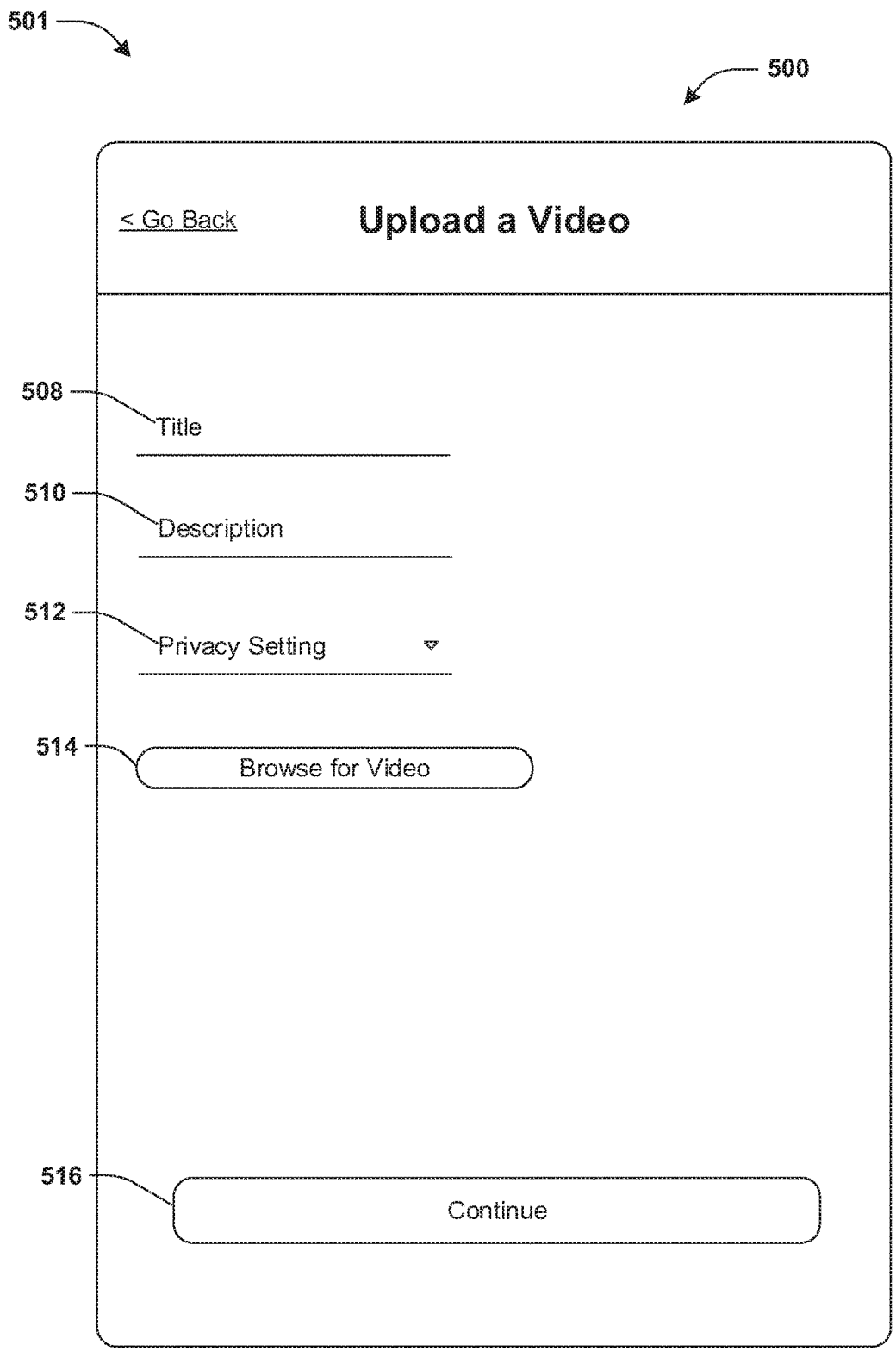
FIG. 5B is a component block diagram illustrating an example system for video encoding.

FIG. 5B illustrates a second page of the interface 500 that may be displayed on the device of the user (e.g., after the user selects the video upload button 506 displayed in FIG. 5A). The second page may be operable for uploading videos, which may include a first input 508 for entering a title associated with a video file to be uploaded, a second input 510 for entering a description associated with the video file, and/or a third input 512 for selecting a privacy setting associated with the video file. The privacy setting may, for example, define a scope of users that may access and/or search for a version of the video file (e.g., after it has been uploaded). A fourth input 514 may be selected to identify the video file to be uploaded (e.g., on a location in storage of the device 500, on a second device connected to the device 500 via a network, on a location on the Internet, etc.). The user may select a (e.g., continue) button 516 to submit information entered into the interface 500 to the server, for example.

FIG. 5C illustrates a third page of the interface 500 that may be displayed on the device of the user (e.g., after the user selects the button 516 displayed in FIG. 5B). The third page may present information determined based upon analysis of the video file identified by the fourth input 514. For example, the third page may indicate a first bitrate determined for a first portion of the video file in association with a first representation corresponding to a first resolution, a second bitrate determined for a second portion of the video file in association with the first representation corresponding to the first resolution, and/or an average bitrate determined for the portions of the video file in association with the first representation corresponding to the first resolution. The third page may further present one or more first bitrates determined for the first portion of the video file in association with one or more other representations corresponding to one or more other resolutions, one or more second bitrates determined for the second portion of the video file in association with the one or more other representations corresponding to the one or more other resolutions, and/or one or more average bitrates determined for the portions of the video file in association with the one or more other representations corresponding to the one or more other resolutions. It may be appreciated that instead of and/or in addition to bitrates, the third page of the interface 500 may present information about CRFs, SSIMs and/or PSNRs determined (e.g., derived) for the portions of the video file in association with the first representation corresponding to the first resolution and/or the one or more other representations corresponding to the one or more other resolutions. The user may select a (e.g., continue) button 518 to provide an indication of acceptance and/or acknowledgement of at least some of the information displayed in the interface 500 to the server, for example.

Figure 5D:
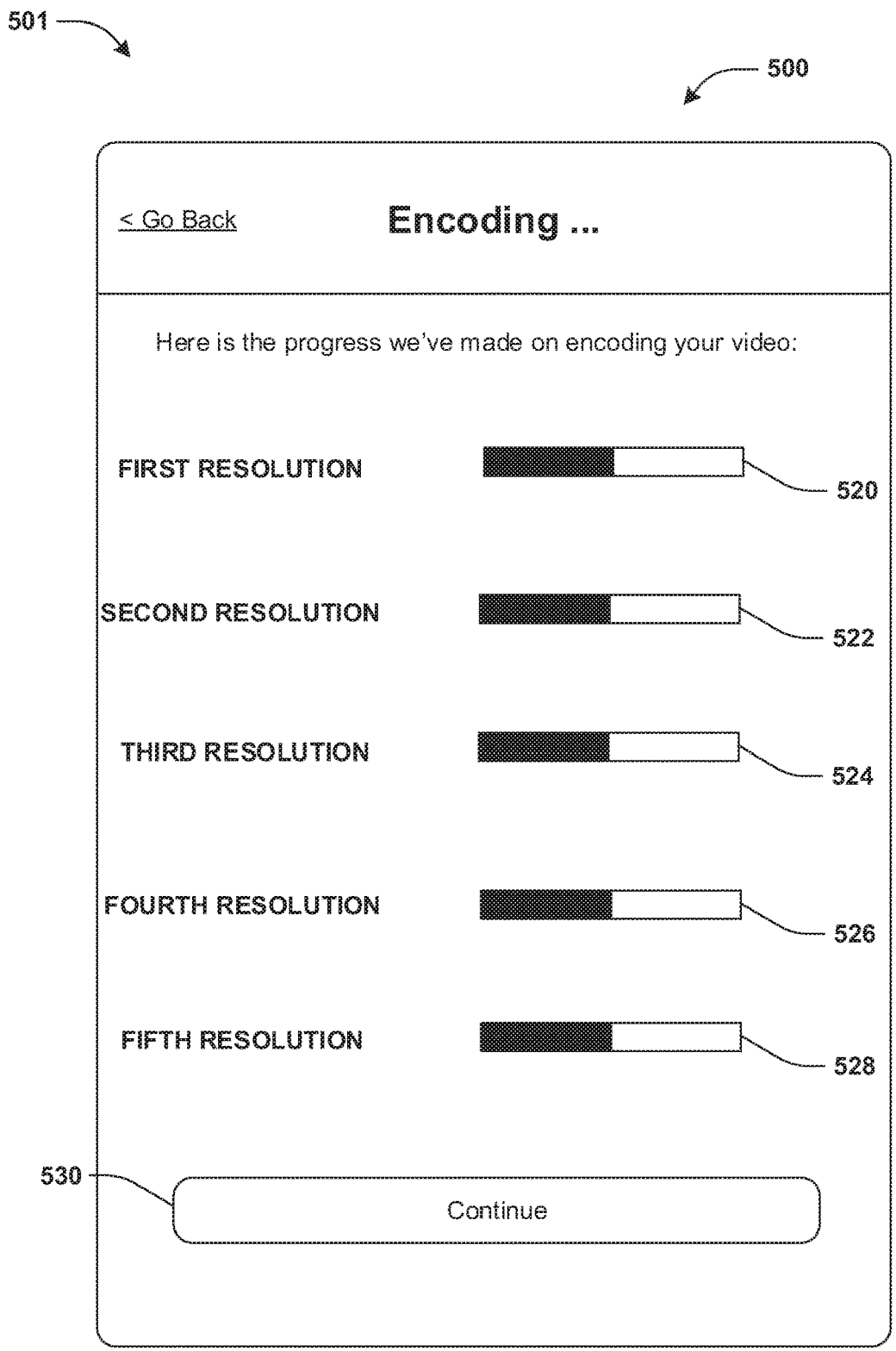
FIG. 5D is a component block diagram illustrating an example system for video encoding.

FIG. 5D illustrates a fourth page of the interface 500 that may be displayed on the device of the user (e.g., after the user selects the button 518 displayed in FIG. 5C). The fourth page may indicate that the video file is being encoded in one or more resolutions, and may display a first indicator 520 representative of a first level of progress made in encoding the video file in the first resolution, a second indicator 522 representative of a second level of progress made in encoding the video file in a second resolution, a third indicator 524 representative of a third level of progress made in encoding the video file in a third resolution, a fourth indicator 526 representative of a fourth level of progress made in encoding the video file in a fourth resolution and/or a fifth indicator 528 representative of a fifth level of progress made in encoding the video file in a fifth resolution. The first level of progress, the second level of progress, the third level of progress, the fourth level of progress and/or the fifth level of progress may the same and/or different.

It may be appreciated that the level of progress for a resolution may be displayed in the indicator corresponding to the resolution relative to (e.g., as a proportion of) a total amount of processing and/or time required to encode the video file at the resolution. For example, the first indicator 520 may comprise a stacked bar graph comprising a first portion representative of an amount of processing performed and/or time passed and a second portion representative of remaining amount of processing and/or time required to encode the video file at the first resolution. The user may select a (e.g., continue) button 530 to provide an indication of acceptance and/or acknowledgement of at least some of the information displayed in the interface 500 to the server, for example.

Figure 5E:
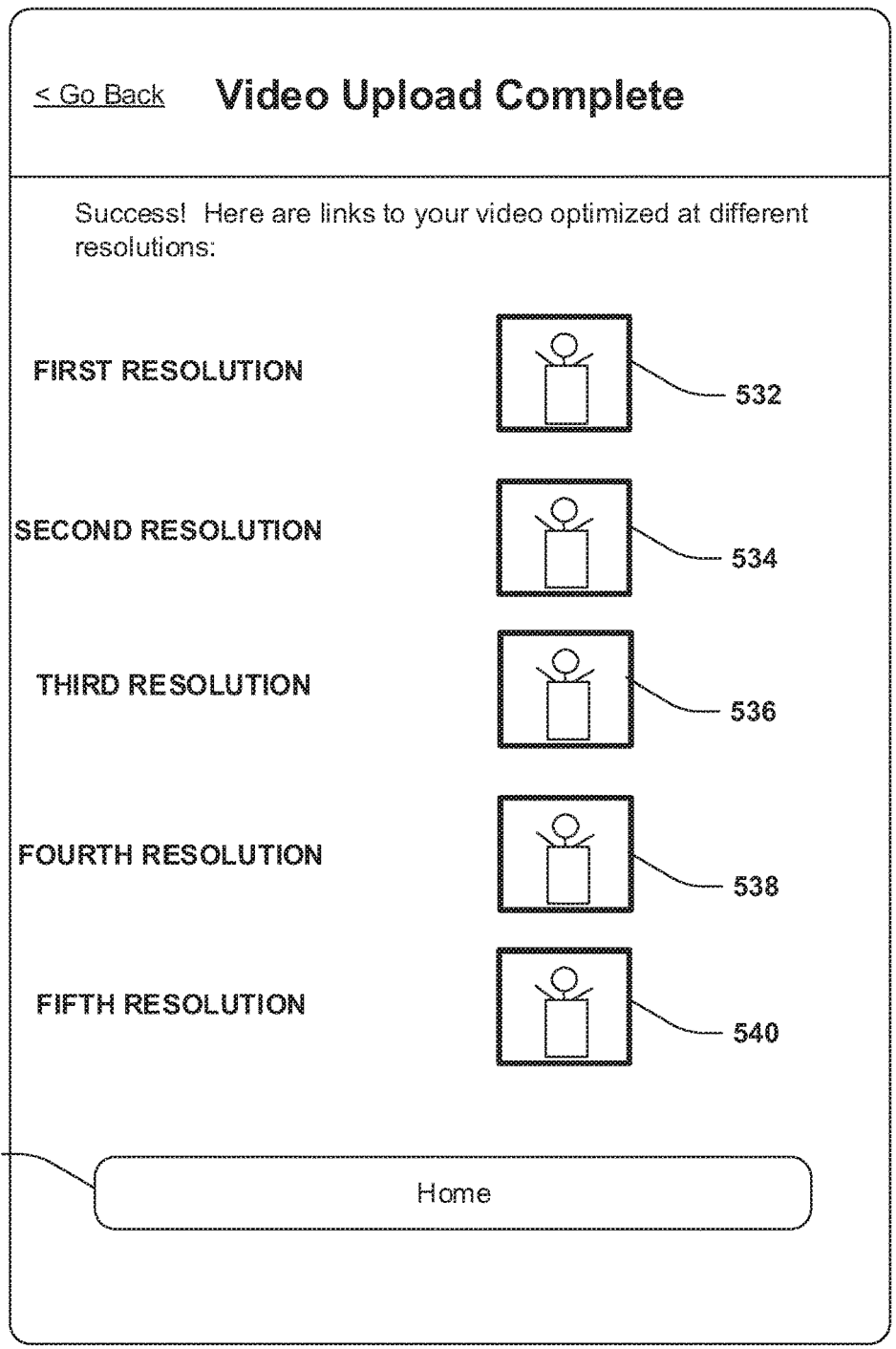
FIG. 5E is a component block diagram illustrating an example system for video encoding.

FIG. 5E illustrates a fifth page of the interface 500 that may be displayed on the device of the user (e.g., after the user selects the button 530 displayed in FIG. 5D). The fifth page may indicate that the video file has successfully been uploaded and encoded in one or more resolutions, and may display a first indicator 532 providing access (e.g., via a link) to an output (e.g., optimized) video file in the first resolution, a second indicator 534 providing access (e.g., via a link) to an output (e.g., optimized) video file in the second resolution, a third indicator 536 providing access (e.g., via a link) to an output (e.g., optimized) video file in the third resolution, a fourth indicator 538 providing access (e.g., via a link) to an output (e.g., optimized) video file in the fourth resolution and/or a fifth indicator 540 providing access (e.g., via a link) to an output (e.g., optimized) video file in the fifth resolution.

The indicators may be graphical representations of the video file, and may be the same for the different resolutions, or may be different for each of the resolutions. For example, the first indicator 532 may be the graphical representation of the video file modified by a first filter, the second indicator 534 may be the graphical representation of the video file modified by a second filter, the third indicator 536 may be the graphical representation of the video file modified by a third filter, the fourth indicator 538 may be the graphical representation of the video file modified by a fourth filter, and/or the fifth indicator 540 may be the graphical representation of the video file modified by a fifth filter. Each filter may correspond to a different shading, size, a watermark, or other modifier that may be determined based upon the corresponding resolution (e.g., and/or based upon one or more corresponding bitrates).

The user may select a (e.g., home) button 542 to provide an indication of acceptance and/or acknowledgement of at least some of the information displayed in the interface 500 to the server and/or to be redirected to a homepage of the application, for example.

In some examples, at least some of the disclosed subject matter may be implemented on a client (e.g., a device of a user), and in some examples, at least some of the disclosed subject matter may be implemented on a server (e.g., hosting a service accessible via a network, such as the Internet).

Figure 6:
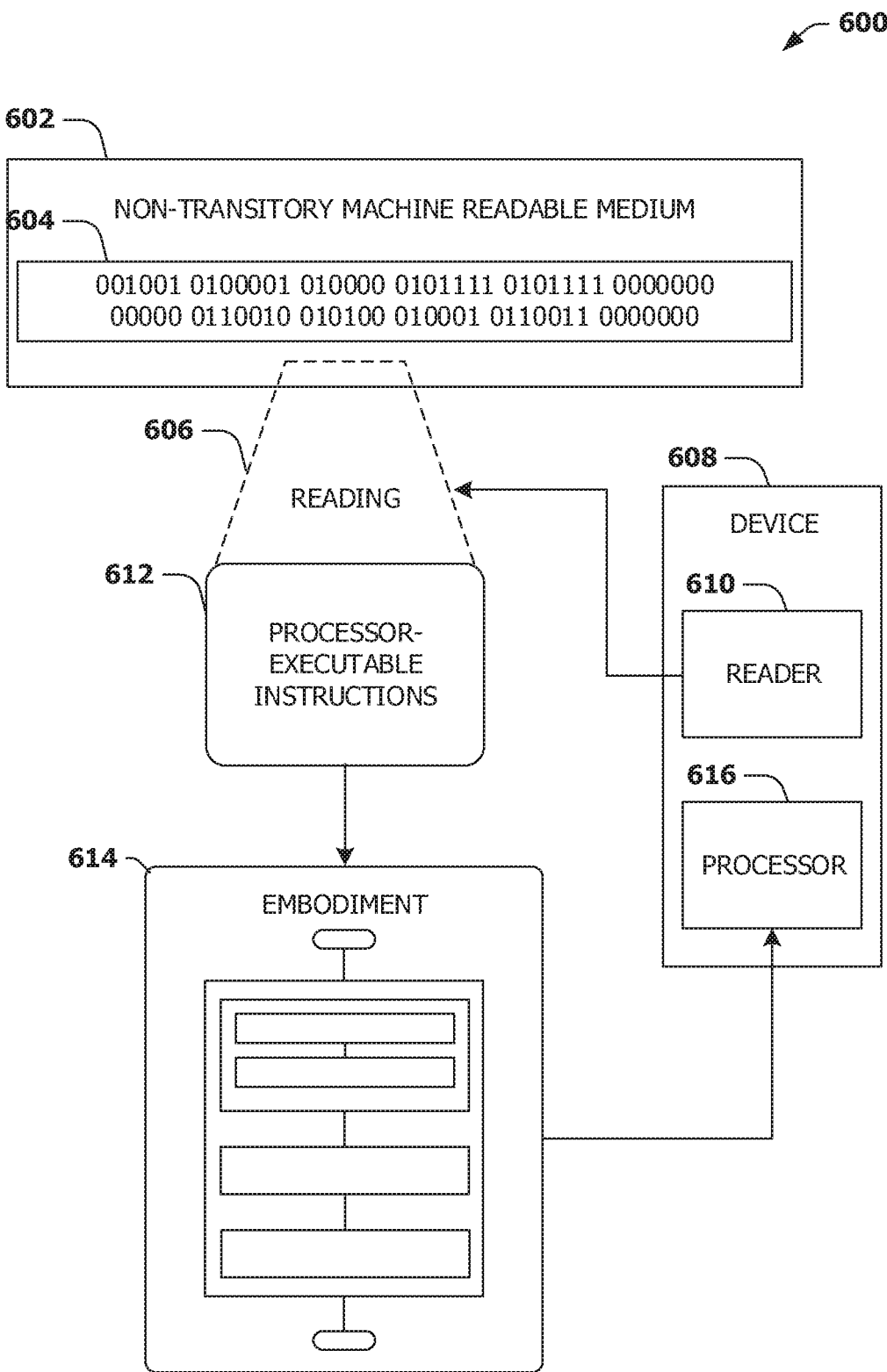
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance and/or implementation of an embodiment 614, such as at least some of the example method 400 of FIG. 4A, for example, and/or at least some of the example system 405 of FIG. 4B, the example system 415 of FIG. 4C and/or the example system 501 of FIGS. 5A-5E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for video encoding, comprising:
receiving a video file;
segmenting the video file into at least a first portion and a second portion;
in parallel:
analyzing the first portion to determine a first value associated with the first portion; and
analyzing the second portion to determine a second value associated with the second portion;
in parallel:
determining a first bitrate associated with the first portion; and determining a second bitrate associated with the second portion;

at least one of:
    determining whether the first value associated with the first portion is within a threshold of the second value associated with the second portion; or
    determining whether the first bitrate associated with the first portion is within a second threshold of the second bitrate associated with the second portion;

in response to at least one of determining that the first value associated with the first portion is within the threshold of the second value associated with the second portion or determining that the first bitrate associated with the first portion is within the second threshold of the second bitrate associated with the second portion, in parallel:
    encoding the first portion at the first bitrate to generate a first encoded portion; and
    encoding the second portion at the second bitrate to generate a second encoded portion; and
assembling the first encoded portion and the second encoded portion to generate a second video file.

2. The method of claim 1, wherein the first bitrate and the second bitrate correspond to a first resolution.

3. The method of claim 2, comprising:
in parallel:
    determining a third bitrate associated with the first portion; and
    determining a fourth bitrate associated with the second portion, wherein the third bitrate and the fourth bitrate correspond to a second resolution different than the first resolution.

4. The method of claim 3, wherein the second video file corresponds to the first resolution.

5. The method of claim 4, comprising:
in parallel:
    encoding the first portion at the third bitrate to generate a third encoded portion; and
    encoding the second portion at the fourth bitrate to generate a fourth encoded portion; and
assembling the third encoded portion and the fourth encoded portion to generate a third video file, wherein the third video file corresponds to the second resolution.

6. The method of claim 5, wherein the third bitrate is different than the first bitrate and the fourth bitrate is different than the second bitrate.

7. The method of claim 1, wherein:
the analyzing the first portion comprises determining a first Structural SIMilarity (SSIM) associated with the first portion.

8. The method of claim 7, wherein:
the analyzing the second portion comprises determining a second SSIM associated with the second portion.

9. The method of claim 1, wherein:
the analyzing the first portion comprises determining a first Constant Rate Factor (CRF) associated with the first portion.

10. The method of claim 9, wherein:
the analyzing the second portion comprises determining a second CRF associated with the second portion.

11. The method of claim 1, wherein:
the analyzing the first portion comprises determining a first peak signal-to-noise ratio (PSNR) associated with the first portion.

12. The method of claim 11, wherein:
the analyzing the second portion comprises determining a second PSNR associated with the second portion.

13. The method of claim 1, wherein the first value is at least one of a first Structural SIMilarity (SSIM), a first Constant Rate Factor (CRF) or a first peak signal-to-noise ratio (PSNR), and the second value is at least one of a second SSIM, a second CRF or a second PSNR.

14. The method of claim 1, wherein a first set of bitrates comprising the first bitrate and the second bitrate corresponds to a first resolution, the method comprising:
    determining a third bitrate associated with the first portion;
    determining a fourth bitrate associated with the second portion, wherein a second set of bitrates comprising the third bitrate and the fourth bitrate corresponds to a second resolution;
    determining whether a difference between the first set of bitrates and the second set of bitrates corresponds to a difference in quality defined by one or more rules; and
    in response to determining that the difference between the first bitrate and the second bitrate corresponds to the difference in quality, performing the encoding the first portion and the encoding the second portion.

15. A computing device comprising:
a processor; and
memory comprising processor-executable instructions that when executed by the processor cause performance of operations, the operations comprising:
    receiving a video file;
    segmenting the video file into at least a first portion and a second portion adjacent to the first portion;
    in parallel:
        analyzing the first portion to determine a first value associated with the first portion; and
        analyzing the second portion to determine a second value associated with the second portion;
    in parallel:
        determining a first bitrate associated with the first portion, wherein the determining the first bitrate comprises selecting the first bitrate from a plurality of first bitrates in response to determining that the first bitrate is associated with at least a threshold increase in quality over another bitrate of the plurality of first bitrates; and
        determining a second bitrate associated with the second portion;
    based upon a comparison of the first value associated with the first portion and the second value associated with the second portion, in parallel:
        encoding the first portion at the first bitrate to generate a first encoded portion; and
        encoding the second portion at the second bitrate to generate a second encoded portion; and
    assembling the first encoded portion and the second encoded portion to generate a second video file.

16. The computing device of claim 15, wherein a first set of bitrates comprising the first bitrate and the second bitrate corresponds to a first resolution, the operations comprising:
    determining a third bitrate associated with the first portion;
    determining a fourth bitrate associated with the second portion, wherein a second set of bitrates comprising the third bitrate and the fourth bitrate corresponds to a second resolution;
    determining whether a difference between the first set of bitrates and the second set of bitrates corresponds to a difference in quality defined by one or more rules; and in response to determining that the difference between the first bitrate and the second bitrate corresponds to the difference in quality, performing the encoding the first portion and the encoding the second portion.

17. A non-transitory machine readable medium having stored thereon processor-executable instructions that when executed cause performance of operations, the operations comprising:
receiving a video file;
segmenting the video file into at least a first portion and a second portion;
in parallel:
  analyzing the first portion to determine a first value associated with the first portion; and
  analyzing the second portion to determine a second value associated with the second portion;
in parallel:
  determining a first bitrate associated with the first portion; and
  determining a second bitrate associated with the second portion, wherein a first set of bitrates comprising the first bitrate and the second bitrate corresponds to a first resolution;
in parallel:
  determining a third bitrate associated with the first portion; and
  determining a fourth bitrate associated with the second portion, wherein a second set of bitrates comprising the third bitrate and the fourth bitrate corresponds to a second resolution;
based upon a comparison of the first value associated with the first portion and the second value associated with the second portion, at least one of:
in parallel:
  encoding the first portion at the first bitrate to generate a first encoded portion; and
  encoding the second portion at the second bitrate to generate a second encoded portion; or
in parallel:
  encoding the first portion at the third bitrate to generate a third encoded portion; and
  encoding the second portion at the fourth bitrate to generate a fourth encoded portion; and
at least one of:
  assembling the first encoded portion and the second encoded portion to generate a second video file; or
  assembling the third encoded portion and the fourth encoded portion to generate a third video file.

18. The non-transitory machine readable medium of claim 17, wherein the first resolution is different than the second resolution.

19. The non-transitory machine readable medium of claim 17, wherein the second video file corresponds to the first resolution and the third video file corresponds to the second resolution.

20. The non-transitory machine readable medium of claim 17, wherein the first value is at least one of a first Structural SIMilarity (SSIM), a first Constant Rate Factor (CRF) or a first peak signal-to-noise ratio (PSNR), and the second value is at least one of a second SSIM, a second CRF or a second PSNR.

* * * * *